(12) United States Patent
Ohtomo et al.

(10) Patent No.: US 6,437,859 B1
(45) Date of Patent: Aug. 20, 2002

(54) DEVICE FOR DETECTING OPTICAL POSITION

(75) Inventors: Fumio Ohtomo; Akio Kimura; Ryo-uji Musashi; Ikuo Ishinabe, all of Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 39 days.

(21) Appl. No.: 09/599,984

(22) Filed: Jun. 23, 2000

(30) Foreign Application Priority Data

Jul. 9, 1999 (JP) .............................. 11-195669

(51) Int. Cl.[7] .................... G01B 11/26; G01B 1/00; G01B 21/02
(52) U.S. Cl. ..................... 356/139.07; 250/203.2; 356/141.1
(58) Field of Search ................. 356/4.01–5.15, 356/141.1, 152.1–152.3; 250/203.2

(56) References Cited

U.S. PATENT DOCUMENTS 5,313,409 A  5/1994  Wiklund et al. ............ 364/556

FOREIGN PATENT DOCUMENTS

JP          3282392         * 12/1991

* cited by examiner

*Primary Examiner*—Stephen C. Buczinski
(74) *Attorney, Agent, or Firm*—Nields & Lemack

(57) ABSTRACT

A device for detecting optical position, comprising a photodetection unit 40 having a photodetection optical axis 37 and for outputting a photodetection signal corresponding to a light receiving position of a projected light beam, and a modulation grid 42 arranged on said photodetection optical axis and for equalizing distribution of light quantity of a received light beam, wherein a position of the light beam projected on the photodetection unit is detected based on said photodetection signal.

4 Claims, 7 Drawing Sheets

$$\eta(o) = \frac{1}{d}[s \exp(\frac{2' \pi M}{2}) + (d-s)\exp(-\frac{2' \pi M}{2})]^2$$

$$\eta(m) = 4(\frac{s}{d})^2 [\sin\frac{\pi M}{2} \frac{\sin(\pi ms/d)}{\pi ms/d}]^2$$

$\frac{s}{d} = 0.5$

DEVICE FOR DETECTING OPTICAL POSITION

BACKGROUND OF THE INVENTION

The present invention relates to a device for detecting optical position for detecting a direction of an optical axis in a system having an optical system such as an automatic survey instrument for automatically tracking a target.

A surveying system comprises an automatic survey instrument positioned at a known point and a collimation target disposed on a target side and provided with a reflection prism. The automatic survey instrument is used for automatically collimating or tracking the collimation target at the target point. For the purpose of tracking, the automatic survey instrument is provided with a device for detecting optical position for detecting deviation of the collimation target and a direction of collimation.

FIG. 5 shows an essential portion of an automatic survey instrument. The automatic survey instrument comprises a leveling unit 1 mounted on a tripod (not shown), a base unit 2 mounted on the leveling unit 1, a base stand 3 rotatably mounted around a vertical axis of the base unit 2, and a telescope unit 4 rotatably mounted around a horizontal axis of the base stand 3.

The telescope unit 4 projects a measuring light beam including light components for tracking and light components for distance measurement with different wavelength ranges and comprises an angle detector for measuring a collimation direction of the telescope, a distance-measuring unit for measuring distance to a reflection prism, and a tracking unit for detecting a collimation target and for performing collimation.

The tracking unit is used for projecting an invisible light beam and a visible light beam in the collimation direction and comprises a light emitting unit, a photodetection unit, a control unit, and an optical system for projecting and receiving the tracking light beam, a vertical rotating motor for rotating the telescope unit 4 around the horizontal axis, and a horizontal rotating motor for rotating the base stand 3 together with the telescope unit 4 around the vertical axis.

In the automatic survey instrument for automatically tracking a target as described above, the projected measuring light beam contains light components in different wavelength ranges for tracking and for distance measurement. A reflection light beam reflected by the target and received is divided to light components with different wavelengths for tracking, for distance measurement and for visual purpose. Then, distance measurement and automatic tracking are performed using the distance-measuring light beam and the tracking light beam thus divided.

The tracking light beam for the purpose of tracking is projected toward the reflection prism, which is a target for tracking. After being reflected by the reflection prism, the tracking light enters again from the telescope and forms an image on the photodetection unit. The center of the photodetection unit is aligned with a collimation axis of the telescope. When the image of the reflection prism comes to the center of the photodetection unit, it is identified as the center of collimation. Accurate survey operation must be performed at the center of collimation.

An area sensor may be used as a photodetection unit for detecting the center of collimation. The area sensor itself is expensive in cost and also it requires an expensive arithmetic operation unit because the distance of the photodetecting position from the center of collimation is obtained by calculation. In this respect, a quadrisected element is used, which is simple and sufficient for the purpose.

Referring to FIG. 6, brief description will be given on a quadrisected element photodetector 5.

In the quadrisected or 4-division element photodetector 5, a photodetection area is divided into 4 parts, and each part of photodetection elements 5a, 5b, 5c and 5d is arranged on one of the divided photodetection areas and the four photodetection elements each operate independently. When the quadrisected element photodetector 5 receives the tracking light beam reflected from the reflection prism, photodetection outputs from the parts of photodetection element 5a, 5b, 5c and 5d are compared with each other. If there is output difference between the photodetection elements, it is judged that the reflection prism is not aligned with collimation direction. When there is no output difference between the photodetection elements, it is judged that the reflection prism is aligned with the collimation direction. The quadrisected element photodetector may be designed in such manner that a quadrisected element photodetector is provided at the central portion of the photodetector to have higher accuracy.

The equations (1a) and (1b) as given below each represents an equation to obtain photodetecting position based on the output from the quadrisected element photodetector 5. The photodetecting position is aligned with the center of the quadrisected element photodetector 5 at a position where the values of the two equations is turned to 0.

Position in lateral direction=$[(A+C)-(B+D)]/(A+B+C+D)$ (1a)

Position in longitudinal direction=$[(A+B)-(C+D)]/(A+B+C+D)$ (1b)

Conventionally, when position of a ship for special task or operation or the like is to be detected by automatic tracking, there is no substantial problem even when the accuracy may be relatively low. However, in one-man survey operation using automatic tracking function, it is normal survey operation and requires high accuracy.

For the tracking light beam requiring high accuracy, a laser beam having a high directivity is used in most cases. From the viewpoint of the driving power, a semiconductor laser element is generally used.

The laser beam is coherent light which has the high directivity and is easy to interfere. As shown in FIG. 7, a tracking light beam 7, which is emitted from a semiconductor laser element 6, is turned to a parallel beam by an optical system 8 and this beam is projected. Diffraction occurs in the tracking light beam 7 when it passes through the optical system 8. The semiconductor laser element 6 has a light emitting unit with a cross-section of oblong elliptical shape. In this respect, on the cross-section of the projected tracking light beam 7, ring-like interference fringes appear due to diffraction as shown in FIG. 8. Further, the fringes of ring-like shape are widened in the lateral direction.

The quadrisected element photodetector 5 is the element for detecting the deviation of direction by comparing the output of each element of the four independent photodetection elements. When the photodetection outputs are equal to each other, e.g. when the values of the equations (1a) and (1b) are 0, it is identified as the center. In case the tracking light beam 7 is an image such that a light quantity distribution of the image is continuous normal distribution, the deviation from the central position of the photodetection element can be easily detected by the above equations (1a) and (1b). However, in case of an image having the ring-like interference fringes, the center may not be detected in some cases from the output difference of the photodetection elements 5a, 5b, 5c and 5d of the quadrisected element photodetector 5.

FIG. 9 is a diagram showing relationship between a photodetecting position and a photodetection signal on the quadrisected element photodetector 5 relating to the vertical or horizontal direction. The value of the equations (1a) or (1b) obtained from the level of the photodetection signal is given on the axis of ordinate, and deflection angle of collimation axis with respect to the center of prism is represented on the axis of abscissa. A solid line shows the case where the cross-section of luminous flux of the laser beam has laser intensity of normal distribution, and a broken line represents the case where diffraction has occurred on the laser beam.

In FIG. 9, in case the laser beam has normal distribution, the deflection angle of the collimation axis is turned to 0 when the photodetection signal level is 0. In case of the laser beam with diffraction, even when the photodetection level is 0, the deflection angle of the collimation axis is not turned to 0, and it is difficult to detect the position accurately.

FIG. 10 shows a condition where the tracking light beam having the ring-like interference fringes is received on the quadrisected element photodetector 5. On the photodetection elements 5a and 5c, a ring-like fringe 7b around the luminous flux of the tracking light beam 7 is received as it is equally divided to upper and lower portions. On the photodetection elements 5b and 5d, the central spot 7a is received as it is equally divided to upper and lower portions. When it is assumed that photodetection quantity is the same for the ring-like fringe 7b and the central spot 7a under this photodetecting condition, the result of calculation by the equations (1a) and (1b) is turned to 0, and it is judged that the light beam is received at the center of the quadrisected element photodetector 5. In this case, there is a problem in that the output from the quadrisected element photodetector 5 may be erroneously regarded as the center.

Such problem also occurs in case of the area sensor. Thus, the decrease of measurement accuracy is unavoidable in case diffraction occurs in the laser beam.

SUMMARY OF THE INVENTION

It is an object of the present invention to provide a device for detecting optical position, by which it is possible to perform position detection with high accuracy even when diffraction occurs in the detection light beam used for position detection and an quantity of the detection light is dappled.

To attain the above object, the device for detecting optical position according to the present invention comprises a photodetection unit having a photodetection optical axis and for outputting a photodetection signal corresponding to a light receiving position of a projected light beam and a modulation grid arranged on the photodetection optical axis and for equalizing distribution of light quantity of a received light beam, wherein a position of the light beam projected on the photodetection unit is detected based on the photodetection signal. Also, the present invention provides a device for detecting optical position as described above, wherein the photodetection unit comprises a plurality of photodetection elements, and the photodetecting position is detected based on deviation of the photodetection signal from each of the photodetection elements. Further, the present invention provides a device for detecting optical position as described above, wherein the modulation grid has a pattern of grid shape randomly arranged. Also, the present invention provides a device for detecting optical position as described above, wherein a photodetection unit and a modulation grid together with a projection unit are provided on a tracking optical system of an automatic survey instrument for determining collimation. Further, the present invention provides an automatic survey instrument for automatically tracking a target, comprising a distance-measuring unit and a tracking unit, wherein the tracking unit comprises an optical system for receiving a reflection light beam from the target, and the optical system comprises a photodetection optical axis, a photodetection unit for outputting a photodetection signal corresponding to a position of a projected light beam, and a modulation grid arranged on the photodetection optical axis, and the position of light beam projected on the photodetection unit is detected based on the photodetection signal. The device for detecting optical position of the present invention comprises a modulation grid, and this makes it possible to equalize light quantity distribution of light beam received and to prevent decrease of accuracy in position detection due to light quantity dapple.

DETAILED DESCRIPTION OF THE PREFERRED EMBODIMENT

Figure 1:
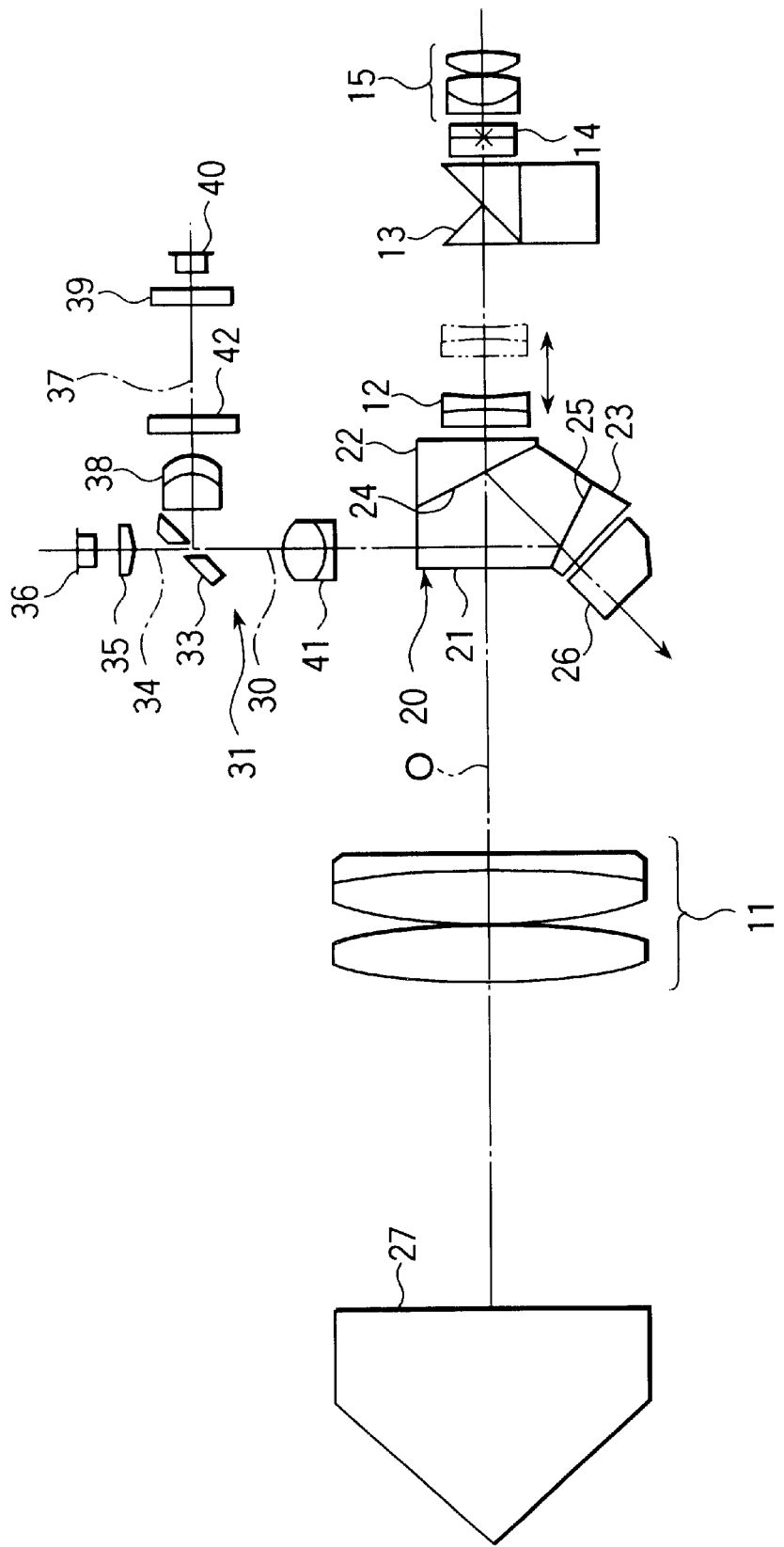
FIG. 1 is a drawing for schematically illustrating an optical arrangement of an embodiment of the present invention.

Description will be given below on an embodiment of the present invention referring to the drawings.

In FIG. 1, an objective lens 11, a focusing lens 12, an erect prism 13, a focusing mirror 14, and an ocular lens 15 are arranged one after another along an optical axis O. Between the objective lens 11 and the focusing lens 12, there is provided optical means, preferably a dichroic prism 20. The dichroic prism 20 comprises a pentagonal prism 21 with wedge type prisms 22 and 23 attached on opposing surfaces thereof respectively to form a first dichroic mirror surface 24 and a second dichroic mirror surface 25.

Of a reflection light beam entering the dichroic mirror surface, the first dichroic mirror surface 24 allows to pass visible light component and reflects infrared light. The second dichroic mirror surface 25 allows to pass a distance-measuring light beam and reflects a tracking light beam. On the optical axis of the reflection light beam reflected by the first dichroic mirror surface 24, a distance-measuring optical system (not shown) is disposed. A tracking optical system 31 is arranged on an tracking optical axis 30 of the tracking light beam reflected by the second dichroic mirror surface 25.

In FIG. 1, reference numeral 26 is a receiving/emitting light splitting mirror and it is arranged in a lateral direction so that light beam can be split in a direction perpendicular to the paper surface. Reference numeral 27 is a target object. In this embodiment, it is a corner cube.

The first dichroic mirror surface 24 allows to pass visible light of 400–650 nm, for example, and reflects infrared light of 650–850 nm. The second dichroic mirror surface 25 reflects infrared light of 650–720 nm and allows to pass infrared light of 720–850 nm.

Now, description will be given on the tracking optical system 31.

An aperture mirror 33 is disposed on the tracking optical axis 30, and a tracking light source 36 which emits a laser beam for tracking via a relay lens 35 is arranged on a transmission optical axis 34 of the aperture mirror 33. A semiconductor laser for emitting a linearly polarized laser beam is used as the tracking light source 36.

A relay lens 38, a band-pass filter 39, and a photodetection unit 40 are arranged on a reflection optical axis 37, i.e., a photodetection optical axis of the photodetection unit 40, of the aperture mirror 33. Between the relay lens 38 and the photodetection unit 40, a phase modulation grid 42 is disposed. The band-pass filter 39 allows to pass light component with wavelength range of the tracking light beam. The photodetection unit 40 is the quadrisected photodetection element as described above, for example, and it can detect the photodetecting position on the photodetection unit 40 at a photodetection ratio of split photodetection elements. The phase modulation grid 42 is used to eliminate a light quantity dapple caused by diffraction.

A relay lens 41 is disposed between the pentagonal prism 21 and the aperture mirror 33 and adjusts diameter of luminous flux of the laser beam passing through the aperture of the aperture mirror 33. Other type of reflection member such as a half-mirror may be used as the aperture mirror 33.

Figure 2:
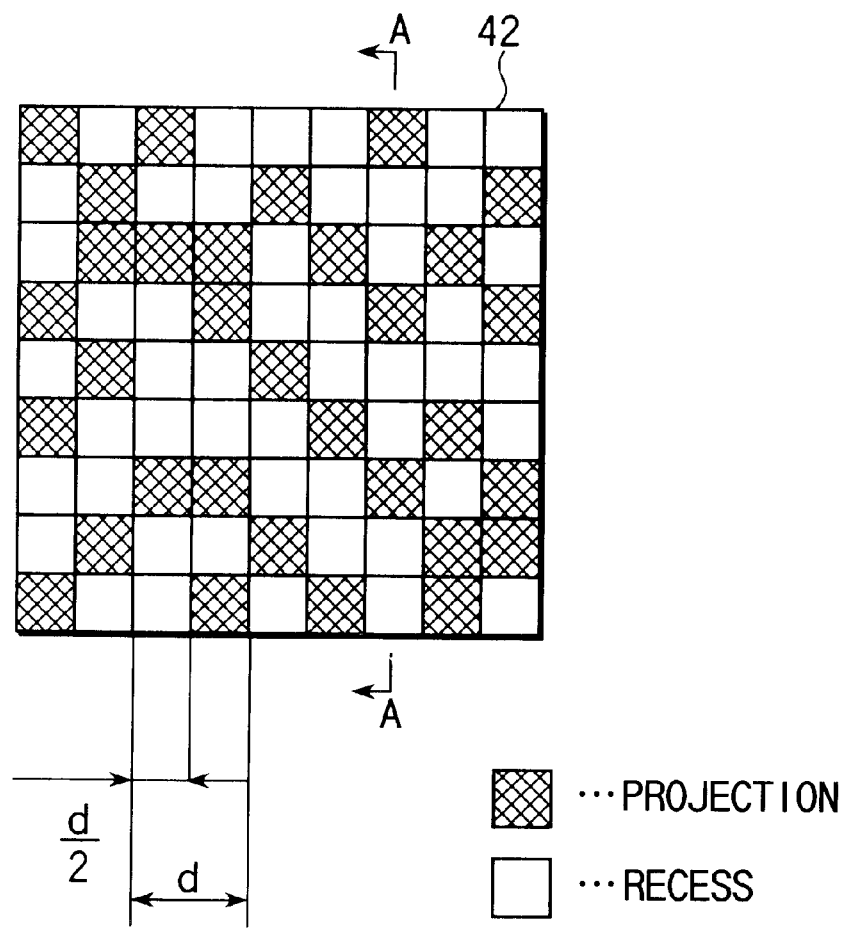
FIG. 2 is a plan view of a phase modulation grid used in the embodiment of the present invention.
Figure 3:
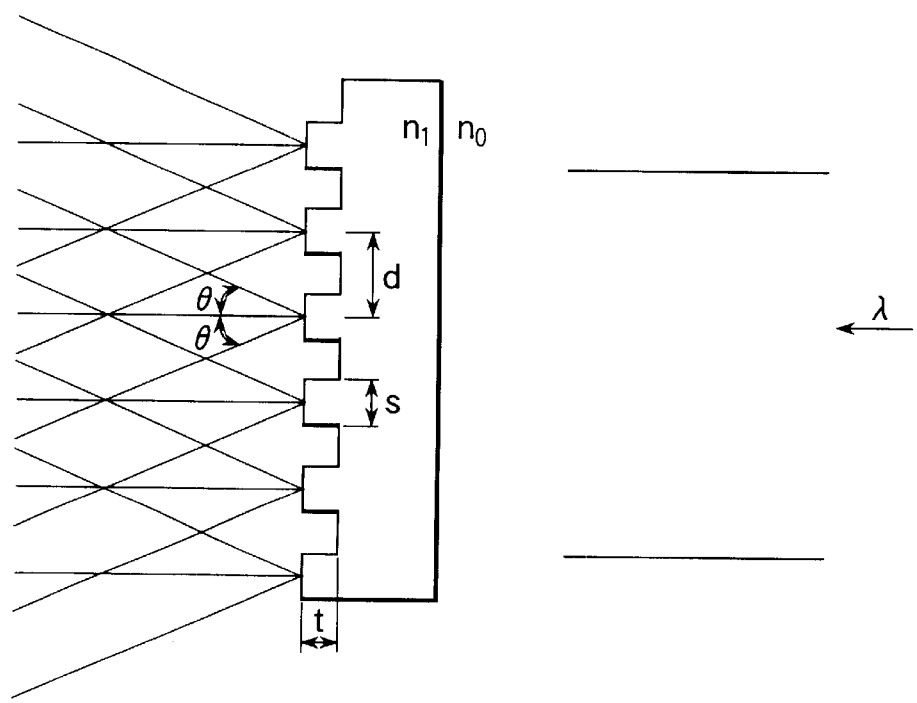
FIG. 3 is an arrow diagram along the line A—A in FIG. 2.

The phase modulation grid 42 is now described referring to FIG. 2 and FIG. 3.

FIG. 2 and FIG. 3 each represents a general type phase modulation grid 42, and it comprises a parallel flat glass plate and "projections and recesses" are formed in a grid-like array with pitch "d" on it. Depth between the top of the projections and the bottom of the recesses is "t". In the phase modulation grid 42, a side of each rectangular projection or recess defined on the plate is d/2 in length. The projections are shown by shading and recesses are shown by open space, and these are arranged at random without any fixed rule. Here, a phase difference between the projection and the recess is $\pi/2$. When a light beam having wavelength $\lambda$ enters the phase modulation grid 42, diffraction occurs. In this case, m-th order diffraction angle $\theta m$ and intensity $\eta m$ of m-th order diffraction angle are given by the following equations respectively:

$$\theta m = m \times (\lambda/d) \quad (2)$$

$$\eta m = 4 \times (S/d)^2 \times [\sin(\pi \times M) \times \sin(\pi \times m \times S/d)/(\pi \times m \times S/d)]^2 \quad (3)$$

where $$M = t \times (n1 - n0) \times (2 \times \lambda) \quad (4)$$

In the above equations, S is width of the projection, n1 is a refractive index of the grid, and n0 is a refractive index of the air.

Figure 4:
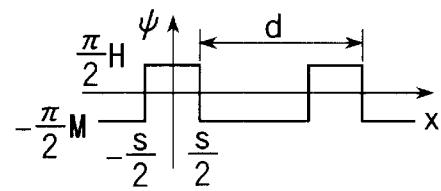
FIG. 4 is a diagram to explain diffraction effect by the phase modulation grid.
Figure 4:
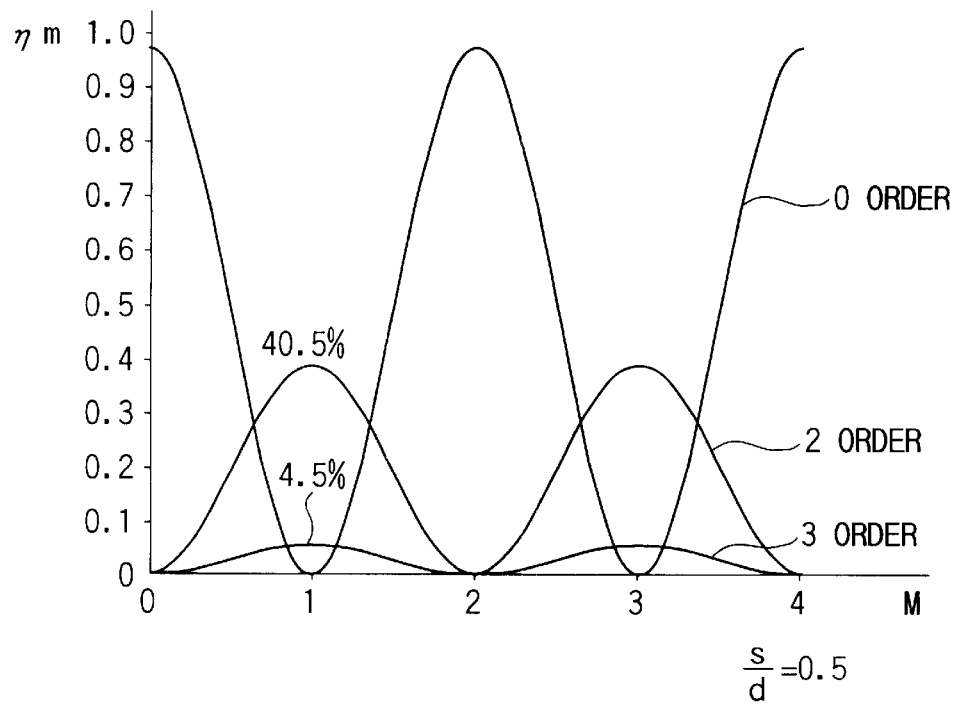
Figure 5:
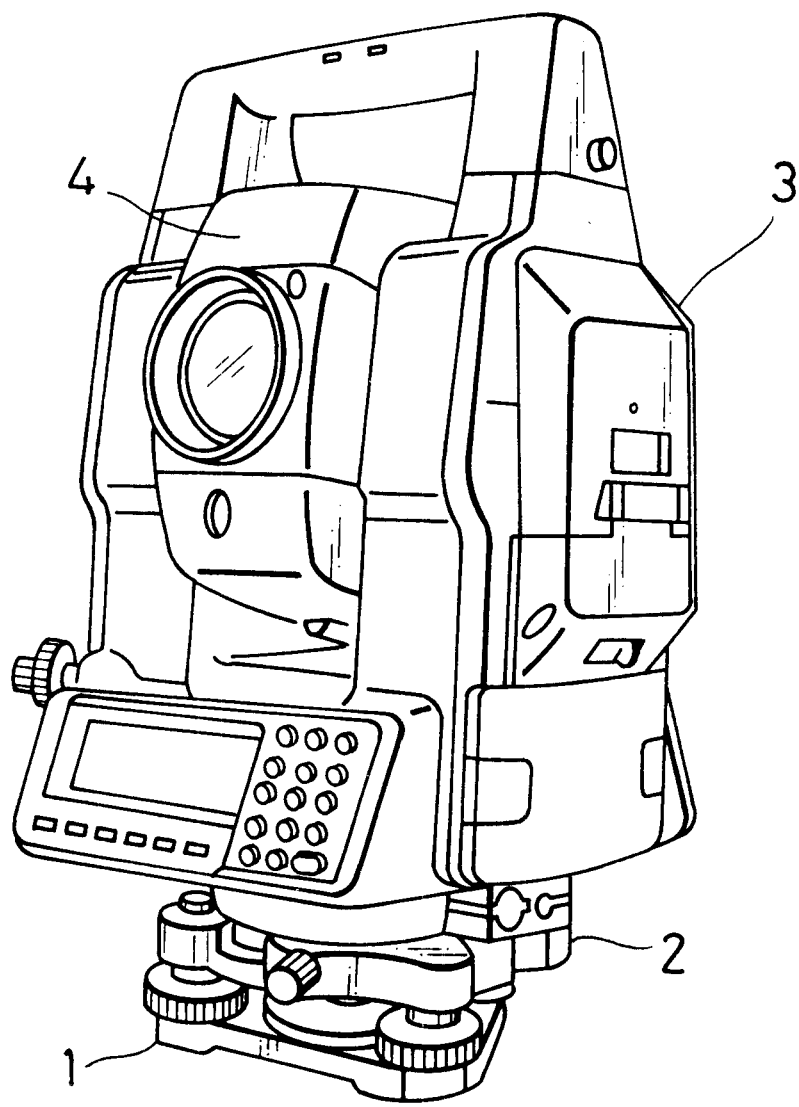
FIG. 5 is a perspective view showing an essential portion of an automatic survey instrument.
Figure 6:
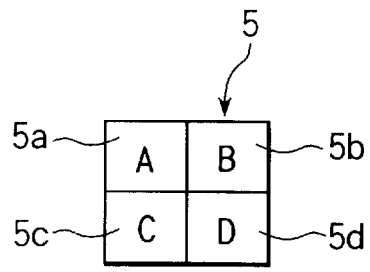
FIG. 6 is a drawing to explain a quadrisected element photodetector.
Figure 7:
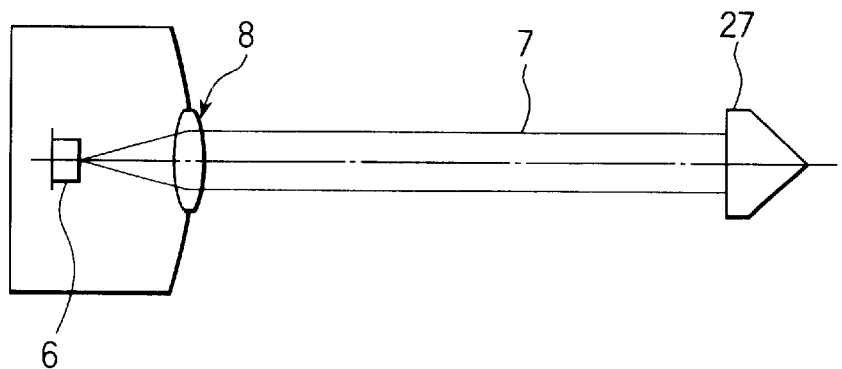
FIG. 7 is a schematical drawing of a projection system for projecting a laser beam.

FIG. 4 shows relationship between M and $\eta m$ when S/d=0.5. Diffraction light has the highest intensity when M=1 (a difference of optical path length between the light passing through the recess and the light passing through the projection is $\lambda/2$). A sum of (+1 order light and −1 order light) accounts for 81% of total light quantity.

In the following, description will be given on operation.

A measuring light beam is projected by the distance-measuring optical system (not shown) and a tracking light beam is emitted from the tracking light source 36. Spread width of the tracking laser beam is variably adjusted by the relay lens 35, and the light beam passes through the aperture of the aperture mirror 33. After passing through the relay lens 41, the tracking laser beam is reflected by the pentagonal prism 21 and is projected toward the corner cube 27 via the objective lens 11.

When the reflection measuring light beam including the tracking reflection light beam reflected by the corner cube 27 enters via the objective lens 11, infrared light components, i.e. the tracking reflection light beam and the distance-measuring reflection light beam, are reflected by the first dichroic mirror surface 24, while visible light component is allowed to pass. After passing through the dichroic mirror surface, the visible light forms an image on the focusing mirror 14 by the focusing lens 12. The image thus formed is further forms an image on a retina of a surveying operator together with a scale of the focusing mirror 14, and collimation is performed.

The first dichroic mirror surface 24 and the second dichroic mirror surface 25 are respectively designed in such manner that visible light and infrared light are divided into two parts with predetermined wavelengths.

Of the infrared light reflected by the first dichroic mirror surface 24, the tracking light beam is reflected by and the distance-measuring light beam is allowed to pass through the second dichroic mirror surface 25. After passing through the second dichroic mirror surface 25, the distance-measuring reflection light beam is received by the distance-measuring optical system (not shown) and the distance is measured. After the tracking reflection light beam enters through the objective lens 11, it is reflected by the second dichroic mirror surface 25 of the pentagonal prism 21 in a direction perpendicularly crossing the optical axis O. Further, the tracking reflection light beam is reflected by the aperture mirror 33. Then, after passing through the phase modulation grid 42, it is converged to the photodetection unit 40 by the relay lens 38.

Figure 8:
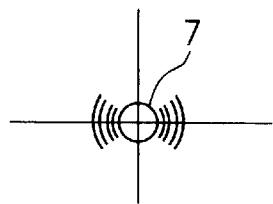
FIG. 8 is a drawing to explain a condition of luminous flux in the projection system.
Figure 9:
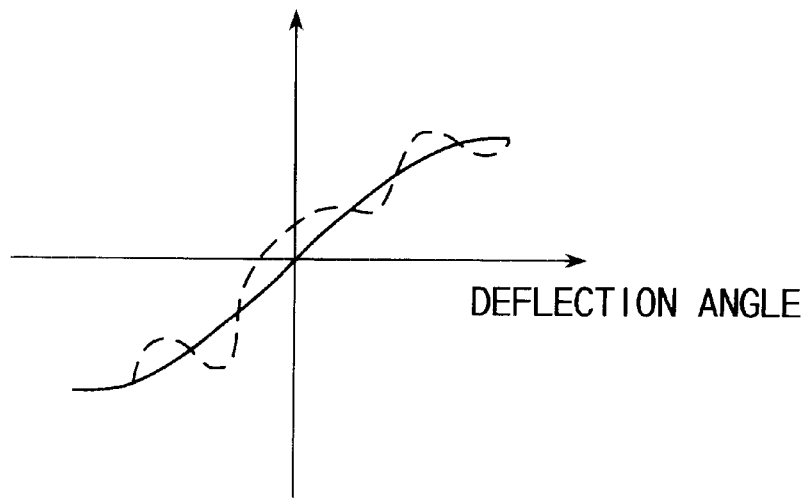
FIG. 9 is a diagram showing relationship between a photodetecting position and a photodetection signal in the quadrisected element photodetector.
Figure 10:
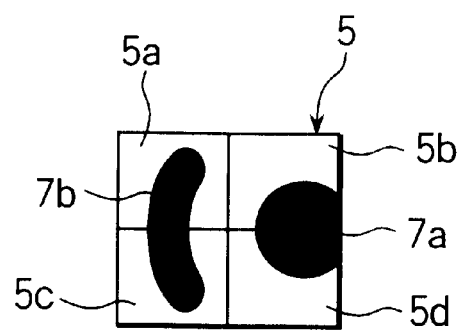
FIG. 10 is a drawing to explain relationship between the quadrisected element photodetector and a tracking light beam.

As described above, the tracking light beam after being reflected by the aperture mirror 33 has ring-like stripes or fringes as shown in FIG. 8. When the reflected tracking light beam passes through the phase modulation grid 42, each of the grid fringes of the tracking light beam undergoes diffraction effect and is diffused, and luminous flux of each of the grid fringes is spread and widened. Therefore, luminous fluxes of a ring-like fringe 7b and a spot 7a as shown in FIG. 10 are spread and widened respectively. The luminous fluxes of the ring-like fringe 7b and the spot 7a overlap on each other, and the light quantity dapple is eliminated. The relationship between the photodetecting position and the photodetection signal is turned to a condition as shown by solid line in FIG. 9. As a result, the optical axis of the tracking light beam can be accurately aligned with the center of the photodetection unit 40 based on the photodetection signal of the photodetection element of the photodetection unit 40. That is, the direction of collimation can be aligned with the corner cube 27.

As an optical member to reduce distribution of light quantity, a diffusion plate is used. Because the light beams are converged near the photodetection unit 40, diffusion effect is low, and the light beams are not diffused very much. If the diffusion plate is arranged away from the photodetection element and near the condenser lens in order to increase the diffusion effect, the light beams are diffused too much because the distance from the photodetection unit 40 is long. As a result, the position of the image cannot be identified. For this reason, the accuracy of position detection is decreased. Because the modulation grid utilizes diffraction, it is preferable that the image is adequately distributed without causing diffusion and attenuation of the light.

The present invention provides a device for detecting optical position for detecting a position of light beam projected on a photodetection unit by a photodetection signal based on photodetection, and a modulation grid is disposed on the photodetection optical axis. As a result, it is possible to equalize distribution of light quantity of the light beam received by the modulation grid and to prevent the decrease of the accuracy of position detection due to light quantity dapple.

What is claimed is:

1. A device for detecting optical position, comprising a photodetection unit having a photodetection optical axis and for outputting a photodetection signal corresponding to a light receiving position of a projected light beam and a modulation grid arranged on said photodetection optical axis and for equalizing distribution of light quantity of a received light beam, wherein said photodetection unit comprises a plurality of photodetection elements, and said position of said light beam projected on said photodetection unit is detected based on the deviation of said photodetection signal from each of said photodetection elements.

2. A device for detecting optical position according to claim 1, wherein said modulation grid has a pattern of grid shape randomly arranged.

3. A device for detecting optical position according to claim 1, wherein said photodetection unit and said modulation grid together with a projection unit are provided on a tracking optical system of an automatic survey instrument for determining collimation.

4. An automatic survey instrument for automatically tracking a target, comprising a distance-measuring unit and a tracking unit, wherein said tracking unit comprises an optical system for receiving a reflection light beam from said target, and said optical system comprises a photodetection optical axis, a photodetection unit for outputting a photodetection signal corresponding to a position of a projected light beam, and a modulation grid arranged on said photodetection optical axis, and wherein said photodetection unit comprises a plurality of photodetection elements, and said position of said light beam projected on said photodetection unit is detected based on the deviation of said photodetection signal from each of said photodetection elements.

* * * * *